(12) United States Patent
Weiler et al.

(10) Patent No.: US 7,596,479 B2
(45) Date of Patent: Sep. 29, 2009

(54) METHOD FOR DETERMINING A BLANK FORM OF AN ELASTIC COMPONENT

(75) Inventors: Michael Weiler, Chungchongbuk-Do (KR); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 10/578,791

(22) PCT Filed: Sep. 10, 2004

(86) PCT No.: PCT/DE2004/002012

§ 371 (c)(1),
(2), (4) Date: May 3, 2006

(87) PCT Pub. No.: WO2005/049397

PCT Pub. Date: Jun. 2, 2005

(65) Prior Publication Data

US 2007/0105458 A1    May 10, 2007

(30) Foreign Application Priority Data

Nov. 8, 2003    (DE) .............................. 103 52 080

(51) Int. Cl.
    *G06G 7/48*    (2006.01)
(52) U.S. Cl. .............................. 703/7; 703/1
(58) Field of Classification Search ............ 703/2, 703/6, 1
    See application file for complete search history.

(56) References Cited

U.S. PATENT DOCUMENTS

| | | | |
|---|---|---|---|
| 3,480,985 A | 12/1969 | Forster | |
| 4,318,201 A | 3/1982 | Rogers et al. | |
| 5,390,391 A * | 2/1995 | Zimmer et al. | 15/250.202 |
| 6,301,742 B1 * | 10/2001 | Kota | 15/250.46 |
| 6,349,447 B1 * | 2/2002 | Zimmer | 15/250.201 |
| 7,075,209 B2 * | 7/2006 | Howell et al. | 310/309 |
| 7,360,272 B2 * | 4/2008 | Kota et al. | 15/250.44 |
| 2006/0265202 A1 | 11/2006 | Muller-Fischer et al. | |

FOREIGN PATENT DOCUMENTS

DE    100 53 299    5/2002

OTHER PUBLICATIONS

Tworzydlo et al, "Knowledge Based Methods and Smart Algorithms in Computational Mechanics", Engineering Fracture Mechanics, vol. 50, No. 5/6, pp. 759-800, 1995.*

(Continued)

*Primary Examiner*—Paul L Rodriguez
*Assistant Examiner*—Mary C Jacob
(74) *Attorney, Agent, or Firm*—Michael Best & Friedrich LLP

(57) ABSTRACT

The invention starts with a method to determine a blank form of an elastic component, in particular a non-articulated wiper arm (10), with the default of a target form, which the elastic component is supposed to assume under the effect of at least a predefined initial force ($F_1$). It is proposed that a counter force ($F_G$) that at least essentially opposes the predefined initial force ($F_1$) is applied to a working model (12) of the elastic component, whose model blank form is at least similar to the target form.

6 Claims, 4 Drawing Sheets

OTHER PUBLICATIONS

Kota et al, "Design of Compliant Mechanisms: Application to MEMS", Analog Integrated Circuits and Signal Processing, 29, 7-15, 2001.*

Billow et al, "Simulation of Aerodynamic Uplift Consequences on Pressure Repartition-Application on an Innovative Wiper Blade Design", Vehicle Aerodynamics Design and Technology-SAE, pp. 235-243, 2001.*

Kim et al, "Optimization of a Hyper-Elastic Structure with Multibody Contact Using Continuum-based Shape Design Sensitivity Analysis", Struct. Multidisc. Optim. 21, 196-208, 2001.*

Mankame et al, "Topology Optimization for Synthesis of Contact-Aided Compliant Mechanisms Using Regularized Contact Modeling", Computers and Structures 82, pp. 1267-1290, 2004.*

* cited by examiner

METHOD FOR DETERMINING A BLANK FORM OF AN ELASTIC COMPONENT

BACKGROUND OF THE INVENTION

The invention starts with a method to determine a blank form of an elastic component.

A method is known to determine a blank form of an elastic, non-articulated wiper arm embodied as a leaf spring with a constant cross section with the default of a target form, which the component is supposed to assume under the effect of a predefined deforming force, in which a blank form is determined by a preliminary bend, whose progression corresponds to that of an elastic, bending beam with one end fixed and whose strength is determined by a bearing force and can be calculated with the aid of known formulae (see Dubbel, *Taschenbuch für den Machinenbau* [Pocketbook of Mechanical Engineering], $19^{th}$ Edition, Springer Verlag, Berlin, Heidelberg, 1997).

SUMMARY OF THE INVENTION

The invention starts with a method to determine a blank form of an elastic component, in particular a non-articulated wiper arm, with the default of a target form, which the elastic component is supposed to assume under the effect of at least a predefined initial force.

It is proposed that a counter force that at least essentially opposes the predefined initial force is applied to a working model of the elastic component, whose model blank form is at least similar to the target form. As a result, the blank form can be determined advantageously in a purposeful manner, while avoiding multiple attempts and without great mathematical expense. A blank form can be determined, which fulfills both the relevant requirements for a design of the target form as well as the relevant requirements for the function of the elastic component. In the case of a non-articulated wiper arm, it is possible to advantageously achieve a bearing force that has been optimized with respect to wiping quality and wiping comfort with a target form of the wiper arm dictated by aerodynamics and design, which said wiper arm assumes in an assembled state on a motor vehicle. With respect to the aerodynamic properties of the wiper arm, the formation of an intermediate space between the wiper arm in its target form and a wiper blade mounted on the wiper arm adjacent to a vehicle window is of crucial importance.

A form of the elastic component, which said elastic component assumes in a configuration that is essentially free of force, should be understood as a blank form. A form of the working model, which said working model assumes under the effect of a blank force, which is at least essentially zero particularly in a first step of the method, but can also assume finite values in intermediate steps, should be understood as a model blank form. It is conceivable to design the method with a working model that is at least essentially geometrically similar to the elastic component, if the relevant forces are subject to the same similarity and scale transformations, which a model blank form of the working model carries over to a target form of the elastic component. It is also conceivable to carry out the method with an elastic material for the working model that is different from a material for the elastic component, if the relevant forces are multiplied by the ratio of the corresponding moduli of elasticity. In accordance with Hooke's law, a deformation of an elastic material under the effect of a force is always proportional to this force. This results in various possibilities of an extrapolative determination of a form, which an elastic component assumes under the effect of a force. Therefore, besides the physical exertion of force, partial or complete mathematical simulations of force and methods that include extrapolation and/or scaling steps should also be understood as the application of a force, particularly a counter force.

It is proposed in an embodiment of the invention that the counter force be increased in intermediate steps in the method. Improved control of a deformation movement can be achieved due to the possibility of making adjustments in intermediate steps. Information about intermediate forms can be advantageously acquired.

If, after at least one intermediate step, a current counter force is aligned in its direction at least partially dependent upon a deformation of the working model, non-linear effects can largely be avoided and a situation can be achieved where the deformation process with an elastic component, whose form was determined in this manner, is essentially reversible in each intermediate step.

It is proposed for an embodiment of the method, in which the working model is deformed in a real manner, that the working model be fixed in the blank form by heating and cooling. In doing so, heating the working model in the blank form is meaningful for easing internal material stress of the working model up to a temperature range just under the melting point of the material of the working model. This embodiment of the method is particularly advantageous in the manufacture of prototypes.

In addition, it is proposed that a deformation of the working model be simulated under the counter force. Materials and forms can be varied simply and cost-effectively by changing parameters of a simulation program and one can make use of tested numeric methods. A finite element method can be used especially advantageously in the numeric simulation. In this connection, both a linear as well as a non-linear finite element method is conceivable.

In this case, the form of an elastic component is approximated by simple three-dimensional building blocks, whose deformation can be analytically calculated under the effect of simple fields of force on their boundary surfaces. An overview of finite element methods can be found in the textbook "*Finite-Elemente-Methoden*" [Finite Element Methods] by Klaus-Jürgen Bathe, published in December 2001 by Springer Verlag, Berlin-Heidelberg.

If the finite element method uses a sub-division into finite elements, in which at least a plurality of the finite elements divides a maximum of two separating surfaces with neighboring finite elements, the numeric expense can be advantageously reduced. A particularly simple sequential processing of the deformation of individual elements is made advantageously possible. Particularly in a linear approximation for the equations of the deformation of the elements, the problem of calculating the blank form can be advantageously reduced to the diagonalization of a band matrix and use can be made of quick numeric methods. Particularly in the case of longish components, such as non-articulated wiper arms, high precision can therefore be achieved with a low number of elements and calculation steps.

BRIEF DESCRIPTION OF THE DRAWINGS

Additional advantages are yielded from the following description of the drawings. An exemplary embodiment of the invention is depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
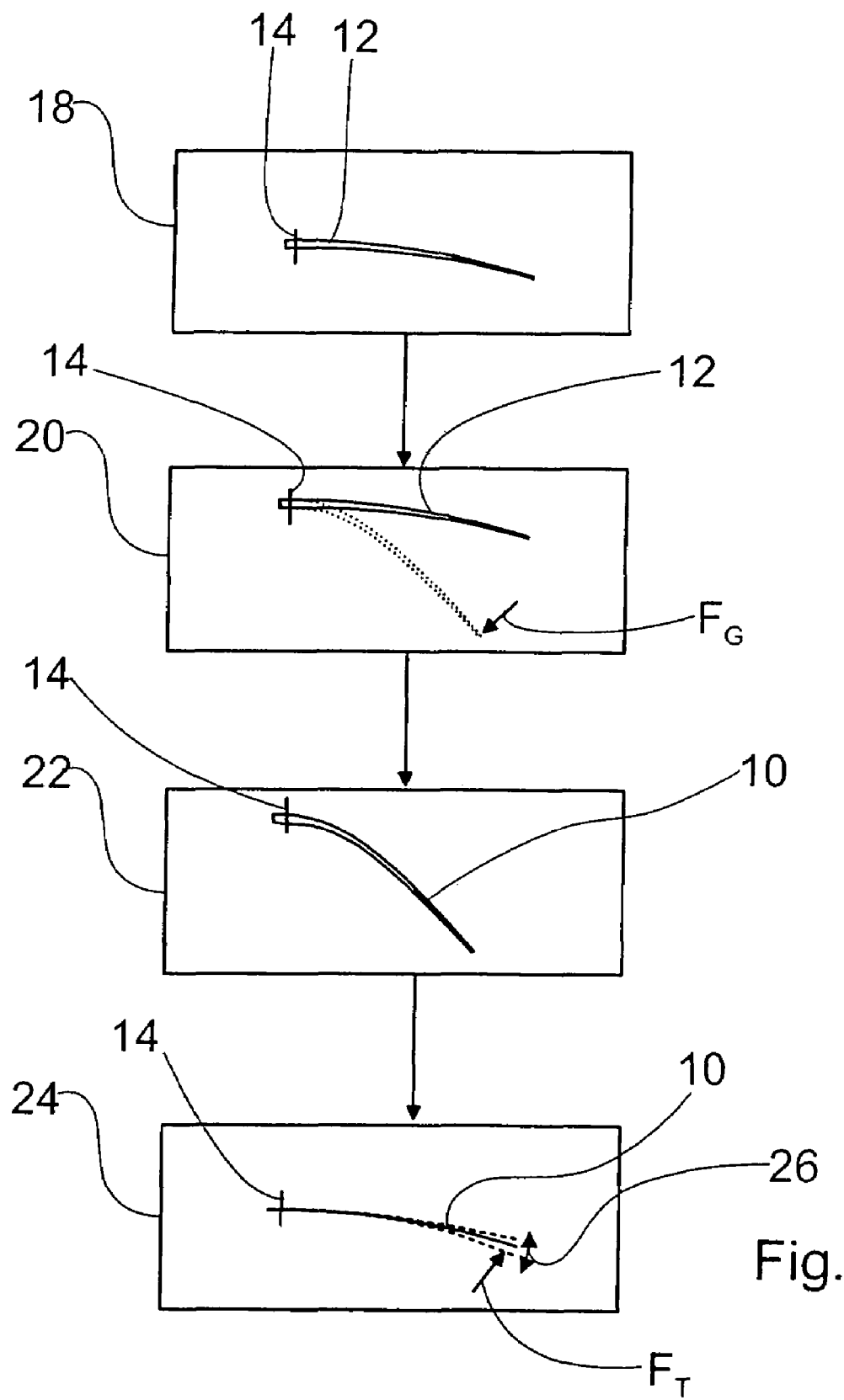
FIG. 1 A flow chart of a method to determine a blank form of a non-articulated wiper arm.
Figure 2:
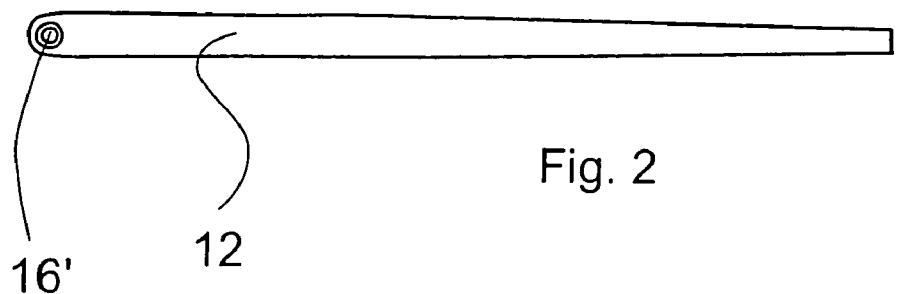
FIG. 2 A top view of a working model of a wiper arm.
Figure 3:
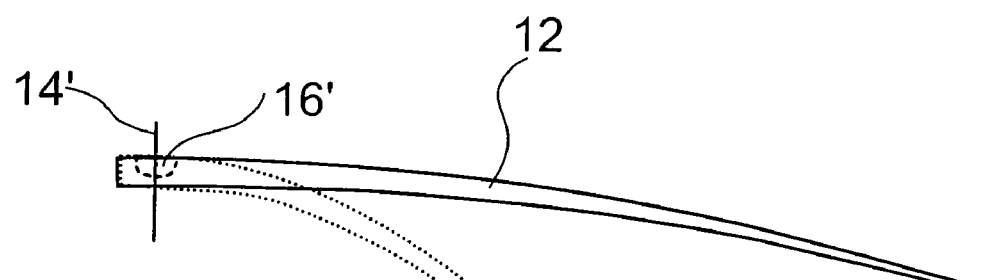
FIG. 3 The working model from FIG. 2 in a model blank form with a counter force applied.
Figure 4:
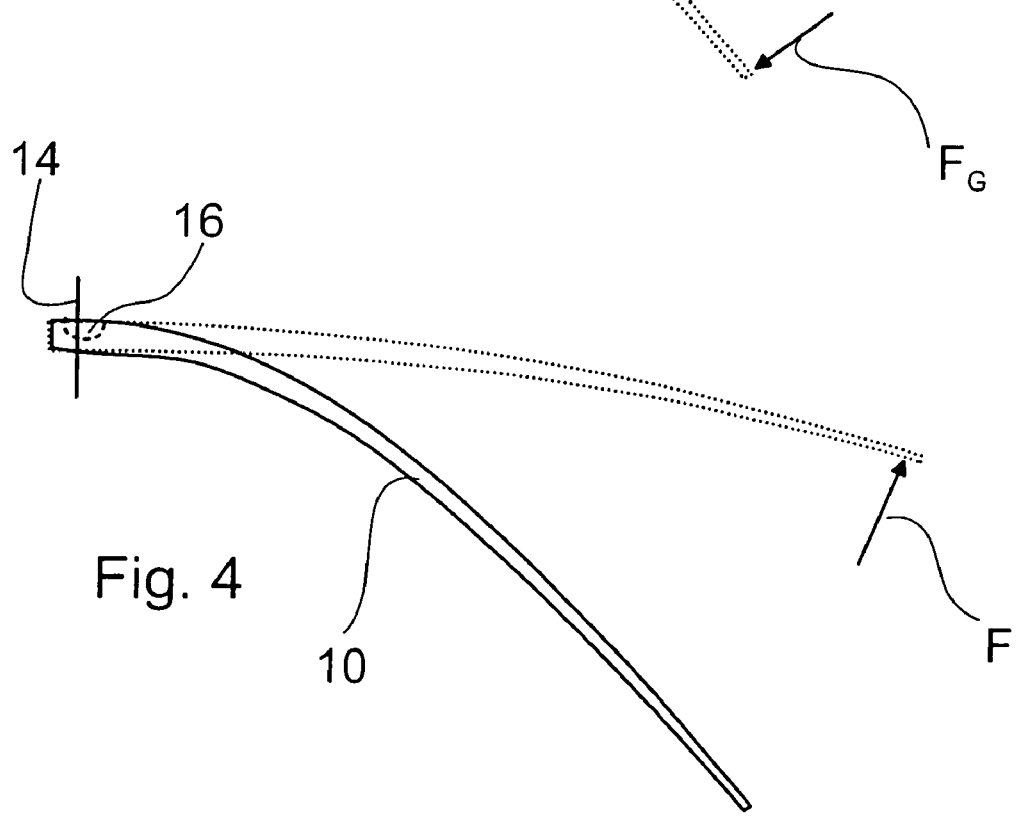
FIG. 4 A non-articulated wiper arm in a blank form and under the effect of a bearing force.

FIG. 1 shows a flow chart of a method to determine a blank form of an elastic component embodied as a non-articulated wiper arm 10 with the default of a target form, which non-articulated wiper arm 10 is supposed to assume under the effect of a predefined initial force $F_1$, which represents a counter force to a bearing force of the wiper arm 10 on a vehicle window (FIG. 4). In a definition step 18, parameters of the desired target form are fed into a memory of an arithmetic-logic unit, which uses a finite element method to simulate a deformation of a simulated working model 12 of the non-articulated wiper arm 10 in the case of a counter force $F_G$ opposing the applied initial force $F_1$ (FIG. 3). A model blank form, which the working model 12 assumes in a configuration that is free of force, is depicted as a solid line in FIG. 3 and is identical to the target form of the non-articulated wiper arm 10, which is depicted as a dotted line in FIG. 4. To simulate the deformation, boundary conditions are selected in such a way that a fastening plane 14' of the working model 12 remains fixed. The fastening plane 14' corresponds to a fastening plane 14 of the wiper arm, which is in an area of the wiper arm 10, in which the latter features an opening 16 for inserting and screwing down a drive shaft (FIG. 3 illustrates a virtual opening 16' that corresponds to the actual opening 16). In a deformation phase 20, the counter force $F_G$ is increased in several intermediate steps up to its end value, wherein in each intermediate step a current counter force $F_G$ is aligned perpendicular to a surface of said working model dependent upon the deformation of the working model 12.

The parameters of the form, which the working model 12 assumes under the effect of the counter force $F_G$ at its end value, are output during an output step and represent the desired information about the blank form of the non-articulated wiper arm 10.

Figure 5:
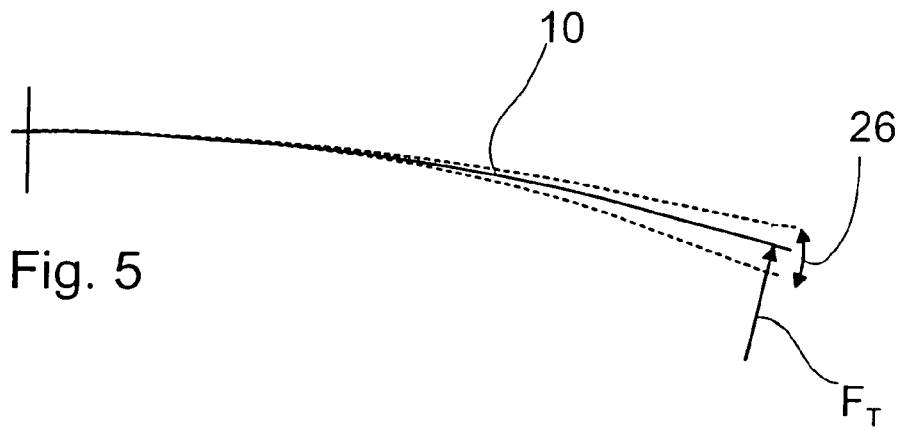
FIG. 5 A schematic representation of a test phase of the method.
Figure 6:
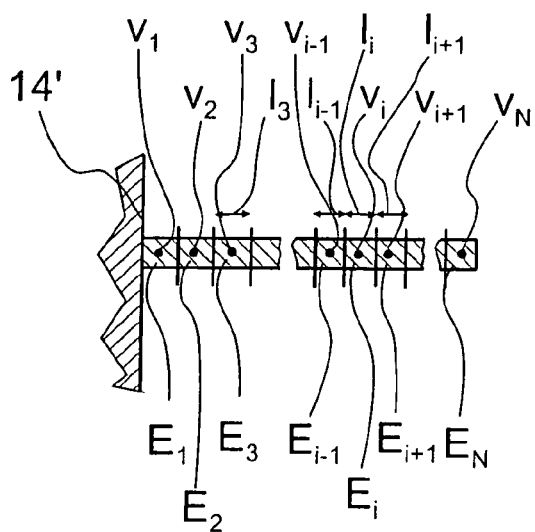
FIG. 6 A schematic representation of a division of the working model into finite elements.

This information can now be used in a test step 24 to simulate elasticity properties of a wiper arm 10 with the calculated blank form. To do this, the effect of a test force $F_T$ on the wiper arm 10 is simulated with the blank form determined in the first steps 18, 20, 22 of the method (FIG. 5). If the test force $F_T$ is gradually increased from zero to the value of the initial force $F_1$, wherein the test force $F_T$ is aligned perpendicular to the surface of the wiper arm 10 in every intermediate step, the wiper arm 10 deforms from the blank form to the target form. To determine the bearing force variations during a stroke movement 26, the test force $F_T$ is varied slightly by the initial force test force $F_1$ and a deflection is assumed as function of the test force $F_T$, i.e., an inverted spring characteristic of the wiper arm 10 (FIG. 6). A flat spring characteristic is advantageous in the area of the bearing force, because the stroke movements 26 in this case generate only small variations of the bearing force and therefore only have an insignificant effect on wiping quality.

Figure 10:
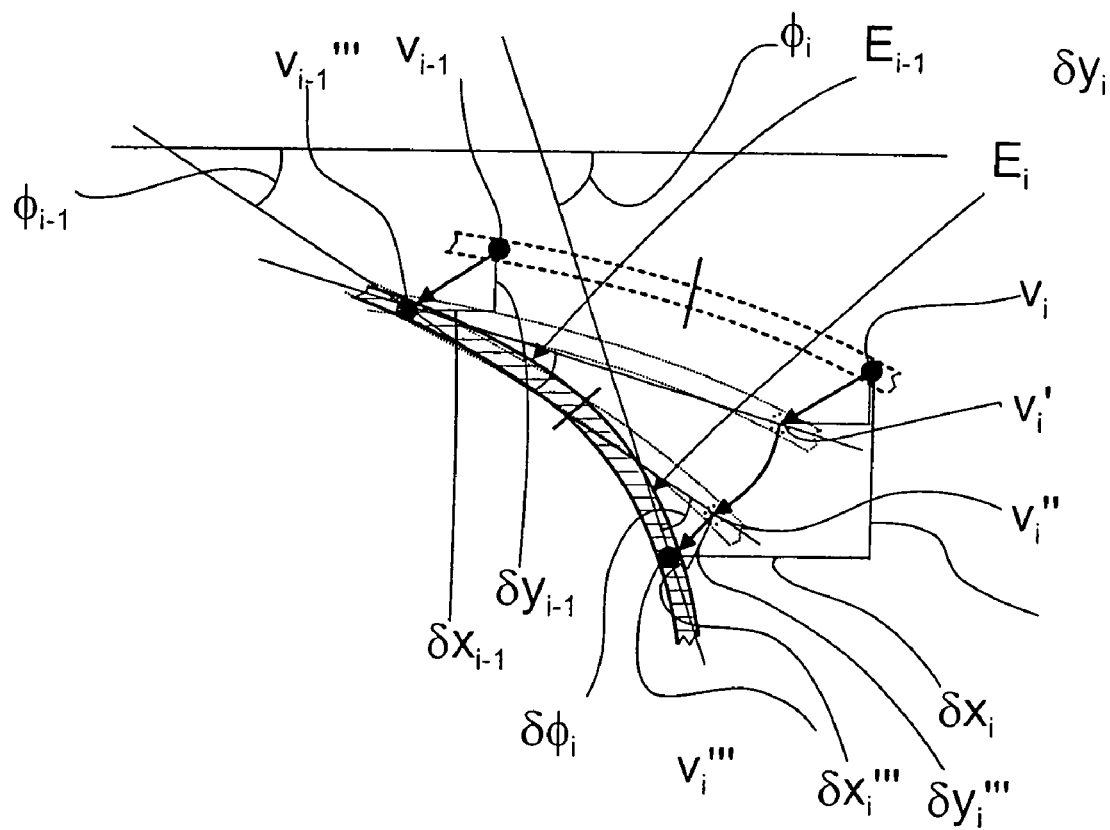
FIG. 10 A schematic representation of a calculation of an entire deformation of a finite element of the working model from FIGS. 1 through 9.

FIG. 10 shows a schematic representation of a simulation of the deformation of a finite element $E_i$ of the working model 12. The simulation algorithm starts with a solid fixing at the fastening plane 14' of the working model 12. There the deflection and angle change are always zero. The working model 12 is divided into finite elements $E_1$-$E_N$ along its longitudinal extension, the deformations of said finite elements are calculated individually and added up (FIG. 6). Each of the finite elements $E_2$-$E_{N-1}$, divides two separating surfaces with neighboring finite elements $E_1$-$E_N$, while the finite elements $E_1$ and $E_N$ situated on an end each only have one neighboring finite element. In areas with stronger cross-sectional or stress changes, finer sub-divisions are selected than in those with approximately the same cross section and the same stress. The target form of the wiper arm 10 is approximated as a stepped form by the model blank form of the working model 12, in that it is assumed in the modeling that the finite elements $E_i$ have constant cross sections over their length $l_i$.

Figures 7, 8, 9:
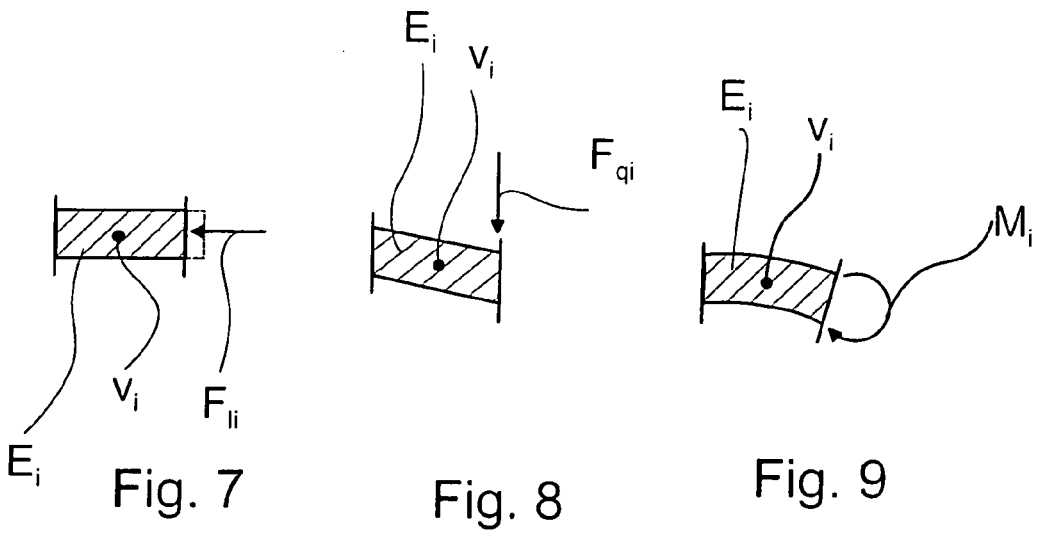
FIG. 7 A schematic representation of a deformation of a finite element under the effect of a longitudinal force.
FIG. 8 A schematic representation of a deformation of a finite element under the effect of a transverse force.
FIG. 9 A schematic representation of a deformation of a finite element under the effect of a bending moment.

The position of each finite element $E_1$-$E_N$ is stored in a center of gravity $v_1$-$v_N$ with center of gravity coordinates $x_1$-$x_N$, $y_1$-$y_N$ and in an angle $\phi_1$-$\phi_N$. A longitudinal force $F_{li}$ (FIG. 7), a transverse force $F_{qi}$ (FIG. 8) and a bending moment $M_i$ (FIG. 9) act on each finite element $E_i$ at the boundary surfaces. The bending moment $M_i$ is calculated as the torque in accordance with $M_i=\Sigma_j F_j * s_{ij}$ from the forces $F_j=F_{lj}+F_{qj}$ on all finite elements $E_j$, $j=1 \ldots N$ and from the distance vectors $s_{ij}=v_i-v_j$ between the finite elements i and j. The vector product is designated here with "*". Starting with finite element $E_1$ on the fastening plane 14', the centers of gravity $v_i$ and the angles $\phi_i$ are inductively calculated for $i=2 \ldots N$. Starting from a displacement $\delta x_{i-1}$, $\delta y_{i-1}$, in a first step, the center of gravity $v_i$ of the finite element $E_i$ is displaced by the same displacement vector and switches over to a center of gravity $v_i'$ (FIG. 10). Subsequently, the center of gravity $v_i'$ is rotated by an angle change $\delta\phi_{i-1}$ around a center of gravity $v_{i-1}$ of a neighboring finite element $E_{i-1}$ and switches over to a center of gravity $v_i''$.

The deformation of the finite element $E_i$ with a constant cross section under the effect of a transverse force $F_{qi}$, a longitudinal force $F_{li}$ and an external moment $M_i$ depends upon the length $l_i$ of the finite element $E_i$, upon an area moment $I_i$ of the cross-sectional surface $A_i$ of the finite element $E_i$ and upon a material-dependent modulus of elasticity E. In particular the following is yielded:

$$\delta\phi_i = F_{qi} l_i^2/(2 I_i E) + M_i l_i/(I_i E)$$

$$\delta y_i' = F_{qi} l_i^3/(3 I_i E) + M_i l_i^2/(2 I_i E)$$

$$\delta x_i' = F_{li} l_i/(A_i E)$$

In this case, the displacements $\delta x_i'$ and $\delta y_i'$ refer to a coordinate system, whose coordinates run tangentially to the progression of a flexional curve of the working model 12 at the location $v_i$. This results in a new angle $\phi_i=\phi_{i-1}+\delta\phi_i$ and a new center of gravity $v_i'''$ with the following coordinates:

$$x_i''' = x_i'' + \cos(\phi_i)\delta x_i' + \sin(\phi_i)\delta y_i'$$

and $y_i''' = y_i'' + \cos(\phi_i)\delta y_i' - \sin(\phi_i)\delta x_i'$

To conclude the induction step, the angle change bi and the elastic displacements $\delta x_i = x_i''' - x_i$ and $\delta y_i = y_i''' - y_i$ are included in the calculation of the coordinates and the angle for the next finite element $E_{i+1}$.

If the deformation of all N finite elements $E_1$-$E_N$ is concluded, the angles $\phi_1$-$\phi_N$ and the centers of gravity $v_1'''$-$v_N'''$ are saved as information for the blank form of the wiper arm (10).

Analogous to the finite element method described above, a wiper arm 10 is simulated in the test phase 24 and said wiper arm is described in a configuration that is free of force via the finite elements with the centers of gravity $v_1'''$-$v_N'''$ and the angles $\phi_1$-$\phi_N$.

The invention claimed is:

1. A method of simulating the deformation of a non-articulated wiper arm, the method comprising:

provinding parameters of a desired target form of the non-articulated wiper arm in the form of electric signals to an arithmetic logic unit that performs arithmetic and logical operations, the arithmetic-logic unit simulating a deformation of a simulated model of the non-articulated wiper arm where a counter force opposes an initial force;

increasing the counter force in several steps up to an end value;

generating assumed form parameters of the form of the simulated model that is created under the effect of the counter force when the counter force is at the end value; and determining a virtual blank form of the non-articulated wiper arm based on the assumed form parameters.

2. A method as in claim 1, further comprising simulating elasticity properties of the non-articulated wiper arm using the virtual blank form of the non-articulated wiper arm.

3. A method as in claim 1, wherein simulating a deformation includes performing a finite element analysis.

4. A method of simulating the deformation of a non-articulated wiper arm, the method comprising:

providing parameters of a desired target form of the non-articulated wiper arm in the form of electric signals to an arithmetic-logic unit that performs arithmetic and logical operations, the arithmetic-logic unit simulating a deformation of a simulated model of the non-articulated wiper arm where a counter force opposes an initial force;

increasing the counter force in several steps up to an end value, wherein in each step a current counter force is aligned perpendicular to a surface of the simulated model of the non-articulated wiper arm;

generating assumed form parameters of the form of the simulated model that is created under the effect of the counter force when the counter force is at the end value, where the assumed form parameters represent information about a blank form of the non-articulated wiper arm;

determining a virtual blank form of the non-articulated wiper arm based on the assumed form parameters; and simulating elasticity properties of the non-articulated wiper arm using the virtual blank form of the non-articulated wiper arm.

5. A method as in claim 4, wherein simulating a deformation includes performing a finite element analysis.

6. A method of simulating the deformation of a non-articulated wiper arm, the method comprising:

providing parameters of a desired target form of the non-articulated wiper arm, which the non-articulated wiper arm is supposed to assume under the effect of an initial force of the non-articulated wiper arm which is counter to a bearing force, wherein the parameters are provided in the form of electrical signals to a digital circuit that performs arithmetic and logical operations, wherein the digital circuit comprises at least one arithmetic-unit, wherein the arithmetic-unit simulates a deformation of a simulated model of the non-articulated wiper arm using a finite element method where a counter force opposes the initial force;

increasing the counter force in several steps up to an end value;

generating parameters of the form of the simulated model that is created under the effect of the counter force when the counter force is at the end value; and determining a virtual blank form of the non-articulated wiper arm based on the generated parameters of the form of the simulated model.

* * * * *

UNITED STATES PATENT AND TRADEMARK OFFICE
CERTIFICATE OF CORRECTION

| | | |
|---|---|---|
| PATENT NO. | : 7,596,479 B2 | Page 1 of 1 |
| APPLICATION NO. | : 10/578791 | |
| DATED | : September 29, 2009 | |
| INVENTOR(S) | : Weiler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 588 days.

Signed and Sealed this

Fourteenth Day of December, 2010

David J. Kappos
*Director of the United States Patent and Trademark Office*